US 8,218,668 B2

(12) United States Patent
Yang et al.

(10) Patent No.: US 8,218,668 B2
(45) Date of Patent: Jul. 10, 2012

(54) MULTI-USER MIMO METHOD, APPARATUS AND COMMUNICATION SYSTEM FOR TRANSMITTING SIGNAL

(75) Inventors: Luxi Yang, Shenzhen (CN); Daofeng Xu, Shenzhen (CN); Bin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 12/510,632

(22) Filed: Jul. 28, 2009

(65) Prior Publication Data

US 2009/0290656 A1    Nov. 26, 2009

Related U.S. Application Data

(63) Continuation of application No. PCT/CN2008/073149, filed on Nov. 21, 2008.

(30) Foreign Application Priority Data

Dec. 14, 2007    (CN) .......................... 2007 1 0302109

(51) Int. Cl.
*H04B 7/02* (2006.01)
(52) U.S. Cl. ...................................... 375/267; 375/299
(58) Field of Classification Search .................. 375/267, 375/299, 341; 370/328
See application file for complete search history.

(56) References Cited

U.S. PATENT DOCUMENTS

| 2004/0087324 | A1  |         | 5/2004  | Ketchum et al. |
|2006/0056338|A1*|3/2006|Abe et al. ...................... 370/328|
|2007/0086536|A1| |4/2007|Ketchum et al.|
|2007/0201575|A1*|8/2007|Ariyavisitakul et al. ..... 375/267|
|2008/0112594|A1*|5/2008|Williams et al. .............. 382/107|
|2008/0279298|A1*|11/2008|Ben-Yishai et al. .......... 375/261|
|2010/0150260|A1*|6/2010|Ariyavisitakul et al. ..... 375/267|

FOREIGN PATENT DOCUMENTS

| CN | 1729634 A | 1/2006 |
| CN | 101039137 A | 9/2007 |
| CN | 101459495 B | 6/2011 |
| WO | WO 2007/041086 A1 | 4/2007 |

OTHER PUBLICATIONS

Written Opinion of the International Searching Authority in corresponding PCT Application No. PCT/CN2008/073149 (Feb. 26, 2009).
Choi et al., "A Transmit Preprocessing Technique for Multiuser MIMO Systems Using a Decomposition Approach," IEEE Transactions on Wireless Communications, Jan. 2004, vol. 3, No. 1, Institute of Electrical and Electronics Engineers, New York, New York.

(Continued)

*Primary Examiner* — Emmanuel Bayard
(74) *Attorney, Agent, or Firm* — Leydig, Voit & Mayer, Ltd.

(57) ABSTRACT

A multi-user multi-input multi-output (MIMO) method for transmitting signal with a includes: performing a Tomlinson-Harashima pre-coding (THP) on raw data; decomposing a channel matrix to a product of a block triangular matrix and a unitary matrix, and generating a signal to be transmitted by performing a forward filtering on the THP coded data by using the unitary matrix. A multi-user MIMO apparatus for transmitting signal includes an interference pre-eliminating unit, a modulo unit, a forward filtering unit, and a channel matrix decomposing unit. A multi-user MIMO communication system is further provided.

18 Claims, 9 Drawing Sheets

OTHER PUBLICATIONS

Jindal, "MIMO Broadcast Channels with Finite Rate Feedback," 2005, Institute of Electrical and Electronics Engineers, New York, New York.

Kusume et al., "Efficient Tomlinson-Harashima Precoding for Spatial Multiplexing on Flat MIMO Channel," 2005, Institute of Electrical and Electronics Engineers, New York, New York.

Marzetta et al., "Fast Transfer of Channel State Information in Wireless Systems," IEEE Transactions on Signal Processing, Apr. 2006, vol. 54, No. 4, Institute of Electrical and Electronics Engineers, New York, New York.

Sanguinetti et al., "Non-Linear Pre-Coding for Multiple-Antenna Multi-User Downlink Transmissions with Different QoS Requirements," IEEE Transactions on Wireless Communications, Mar. 2007, vol. 6, No. 3, Institute of Electrical and Electronics Engineers, New York, New York.

Spencer et al., "Zero-Forcing Methods for Downlink Spatial Multiplexing in Multiuser MIMO Channels," IEEE Transactions on Signal Processing, Feb. 2004, vol. 52, No. 2, Institute of Electrical and Electronics Engineers, New York, New York.

Wang et al., "Joint Tomlinson-Harashima Precoding with Diversity Techniques for Multiuser MIMO Systems," 2005, Institute of Electrical and Electronics Engineers, New York, New York.

Windpassinger et al., "Precoding in Multiantenna and Multiuser Communications," IEEE Transactions on Wireless Communications, Jul. 2004, vol. 3, No. 4, Institute of Electrical and Electronics Engineers, New York, New York.

Xu et al., "Feedback of Downlink Channel State Information Based on Superimposed Coding," IEEE Communications Letters, Mar. 2007, vol. 11, No. 3, Institute of Electrical and Electronics Engineers, New York, New York.

* cited by examiner

MULTI-USER MIMO METHOD, APPARATUS AND COMMUNICATION SYSTEM FOR TRANSMITTING SIGNAL

CROSS-REFERENCE TO RELATED APPLICATIONS

This application is a continuation of International Patent Application No. PCT/CN2008/073149, filed Nov. 21, 2008, which claims priority to Chinese Patent Application No. 200710302109.0, filed Dec. 14, 2007, both of which are hereby incorporated by reference in their entirety.

FIELD OF THE TECHNOLOGY

The present invention relates to a multi-input multi-output (MIMO) communication technique, and more particularly to a multi-user MIMO method for transmitting signal, a multi-user MIMO apparatus for transmitting signal, and a multi-user MIMO communication system.

BACKGROUND

As for a communication system having a plurality of transmission antennas, different data is respectively transmitted to a plurality of different users simultaneously at the same frequency, so that an interference occurs among a plurality of user data. Therefore, it has become a technical problem to be solved in a multi-user communication system to eliminate the interference among multiple users. The multi-user communication system includes a multi-user multiple-input single-output (MISO) communication system and a multi-user MIMO communication system.

In the multi-user MISO communication system, Tomlinson-Harashima pre-coding (THP) is adopted. As a simple and feasible non-linear pre-coding technique, the THP has been widely applied.

The THP technique based on the multi-user MISO communication system can also be applied in the multi-user MIMO communication system. Particularly, the THP is performed by means of considering a plurality of receiving antennas from the same user as different users of a single antenna. Here, in the multi-user MIMO system, cooperative processing among the receiving antennas of the users cannot be adopted. Therefore, in the multi-user MIMO system, optimality of the THP cannot be guaranteed.

In the multi-user MIMO communication system, due to the interferences among the multiple users and the interferences among a plurality of data streams of the user, if the interferences among the users cannot be eliminated, the system performance is seriously affected.

SUMMARY

A main object of embodiments of the present invention is to provide a multi-user MIMO method for transmitting signal, so as to eliminate interferences among multiple users and improve capacity of a system communication.

Another main object of embodiments of the present invention is to provide a multi-user MIMO apparatus for transmitting signal, so as to eliminate interferences among multiple users and improve capacity of a system communication.

Another main object of embodiments of the present invention is to provide a multi-user MIMO communication system, so as to eliminate interferences among multiple users and improve capacity of a system communication.

In order to achieve the above objects, embodiments of the present invention provide a multi-user MIMO method for transmitting signal, which includes: performing THP on raw data; and decomposing a channel matrix to a product of a block triangular matrix and a unitary matrix and generating a signal to be transmitted by performing a forward filtering on the THP coded data by using the unitary matrix.

Embodiments of the present invention provide a multi-user MIMO apparatus for transmitting signal, which includes a channel matrix decomposing unit and a forward filtering unit.

The channel matrix decomposing unit is adapted to decompose a channel matrix to a product of a block triangular matrix, and to transmit the product.

The forward filtering unit is adapted to receive the product, obtain the unitary matrix, perform a forward filtering on data to obtain a signal to be transmitted by using the unitary matrix and output the signal.

Embodiments of the present invention provide a multi-user MIMO communication system, which includes a transmitting end, a channel, and a plurality of receiving ends.

The transmitting end is adapted to perform THP on raw data, to decompose a channel matrix to a product of a block triangular matrix and a unitary matrix, to perform a forward filtering on the THP coded by using the unitary matrix to obtain a signal to be transmitted, and transmit the signal through the channel.

A plurality of receiving ends are adapted to receive the signal. The plurality of receiving ends have a kth receiving end adapted to pre-filter the received signal by utilizing a unitary matrix $U_k^H$, to perform an estimation by utilizing a diagonal matrix $D_k^{-1}$, to perform a modulo operation and to recover the raw data through making decision.

$U_k$ and $D_k$ satisfy $L_k = U_k D_k$, $L_k$ is a $k^{th}$ sub-matrix on a diagonal line of a block triangular matrix and k is an index number indicative a $k^{th}$ user of multiple users.

In the multi-user MIMO method for transmitting signal, the multi-user MIMO apparatus for transmitting signal and multi-user MIMO communication system of embodiments of the present invention, THP is performed on data, and an MIMO channel is decomposed to a product of a block triangular matrix and a unitary matrix, so as to effectively eliminate the interference among the multiple users, thereby improving the system data rate. Furthermore, a combined processing among the plurality of antennas at the receiving end is implemented, so as to improve a system communication capacity, thereby maximizing the system communication capacity.

BRIEF DESCRIPTION OF THE DRAWINGS

Embodiment of the present invention will become more fully understood by reference to the accompanying drawings for illustration only, among which.

DETAILED DESCRIPTION

In order to make the objectives, technical solutions, and beneficial effects of the present invention more comprehensible, a detailed description of the present invention is given below through the following embodiments.

Embodiments of the present invention provide a method and an apparatus for transmitting signals on a transmitting end in a multi-user MIMO communication system, in which a channel matrix is decomposed to a product of a block triangular matrix and a unitary matrix, so as to eliminate interferences among multiple users, and to improve communication capacity of the system by utilizing a combined processing among a plurality of antennas at a receiving end.

Firstly, a channel transmission model of the multi-user MIMO communication system according to an embodiment of the present invention is described below. It is assumed that the number of transmission antennas at a base station is M, the number of user terminals is K, the number of receiving antennas for a $k^{th}$ (k=1, ..., K) user terminal is $N_k$, and $N_r$, a sum of the receiving antennas of all the user terminals, satisfies a relation of $$N_r = \sum_{k=1}^{K} N_k \leq M.$$

It is assumed that the channel between the base station and each user terminal is Rayleigh flat fading, and the channel matrix H from the base station to the user terminal side is:

$$H=[H_1^H H_2^H \ldots H_K^H]^H \qquad (1).$$

The channel matrix H is decomposed to a product of a block lower triangular matrix and the unitary matrix as follows:

$$H=LQ^H \qquad (2).$$

L is the block lower triangular matrix in a form shown in a formula (3), and Q is the unitary matrix, which satisfies $Q \times Q^H = I$.

$$L = \begin{pmatrix} L_1 & & & \\ L_{21} & L_2 & & \\ \ldots & \ldots & \ddots & \\ L_{K1} & L_{K2} & \ldots & L_K \end{pmatrix} \qquad (3)$$

In L, each diagonal sub-block $L_k$ is a sub-matrix with a dimension of $N_k \times N_k$.

A process for decomposing the channel matrix H into the block lower triangular matrix is described as follows.

It is assumed that a singular value decomposition (SVD) of $H_1$ is $$H_1 = U_1(D_1 \ 0) \begin{pmatrix} V_1^H \\ W_1^H \end{pmatrix} = U_1 D_1 V_1^H.$$

If $\overline{H}_2 = H_2(I-V_1V_1^H)$, the SVD of $\overline{H}_2$ is as follows:

$$\overline{H}_2 = U_2(D_2 \ 0) \begin{pmatrix} V_2^H \\ W_2^H \end{pmatrix} = U_2 D_2 V_2^H.$$

In this manner, the SVD is performed on the channel function of the $k^{th}$ (k=1, ..., K) user terminal until the $K^{th}$ user is performed with the SVD:

$$\overline{H}_K = H_K \left( I - \sum_{i=1}^{K-1} V_i V_i^H \right), \qquad (4)$$

$$\overline{H}_K = U_K(D_K \ 0) \begin{pmatrix} V_K^H \\ W_K^H \end{pmatrix} = U_K D_K V_K^H. \qquad (5)$$

When it is defined that $Q=[V_1 \ V_2 \ldots V_K]$, it is proved that $HQ=L$, in which L is the block lower triangular matrix, and each diagonal sub-block thereof can be written as a product of a unitary matrix and a diagonal matrix; Q is the unitary matrix satisfying $QQ^H=I$.

Firstly, it is proved that $Q=[V_1 \ V_2 \ldots V_K]$ is a unitary matrix as follows.

As known from the SVD that, each column of $V_k$ (k=1, ..., K) satisfies the orthogonality, that is, $V_k^H V_k = I$, and $$\text{span}(\overline{H}_k^H) = \text{span}(V_k) \qquad (6).$$

Through mathematical induction, the following formula is derived from the formula (4):

$$\overline{H}_2 V_1 = H_2(I-V_1V_1^H)V_1 = 0 \qquad (7).$$

It can be derived from the formulas (6) and (7) that $$V_2^H V_1 = 0 \qquad (8).$$

As for the $K^{th}$ user, $$\overline{H}_K V_l = H_K \left( I - \sum_{i=1}^{K-1} V_i V_i^H \right) V_l = H_K(V_l - V_l) = 0, \quad (9)$$

$$l = 1, \ldots, k-1.$$

It is assumed that $V_k^H V_j = 0$ ($k \neq j$; $k<K$; $j<K$) through induction, so the second equation in the formula (9) is true. Therefore, it can be derived that $V_K^H V_l = 0$, ($l=1, \ldots K-1$).

Thus, it is known that $Q=[V_1 \ V_2 \ldots V_K]$ satisfies $QQ^H = I$, and it is a unitary matrix.

Then, it is proved that L is the block lower triangular matrix, and each diagonal sub-block thereof can be written as the product of the unitary matrix and the diagonal matrix.

It is derived from the formula (4) that $$H_k = \overline{H}_k + H_k \sum_{i=1}^{k-1} V_i V_i^H \quad (10)$$

$$= (H_k V_1 \ldots H_k V_{k-1} \ U_k D_k \ 0 \ldots 0)$$

$$(V_1 \ldots V_{k-1} \ V_k \ V_{k+1} \ldots V_K)^H.$$

Through comprehensively considering all circumstances of $k=1, \ldots K$, it is derived that $$H = \begin{bmatrix} H_1 \\ H_2 \\ \vdots \\ H_K \end{bmatrix} = \begin{pmatrix} U_1 D_1 & & & \\ H_2 V_1 & U_2 D_2 & & \\ \ldots & \ldots & \ddots & \\ H_K V_1 & H_K V_2 & \ldots & U_K D_K \end{pmatrix} \begin{pmatrix} V_1^H \\ V_2^H \\ \vdots \\ V_K^H \end{pmatrix} \triangleq LQ^H. \quad (11)$$

When the block lower triangular matrix L is taken as an equivalent channel matrix, the user coded later does not interfere with the user coded earlier, so as to improve the communication capacity and to enhance the system performance.

In addition, in the block lower triangular matrix L generated by decomposing the channel matrix H, each diagonal sub-block $L_k$ can be written as the product of the unitary matrix and the diagonal matrix, that is, $$L_k = U_k D_k \quad (12).$$

in which $U_k$ is a unitary matrix of $N_k \times N_k$, and $D_k$ is a real diagonal matrix of $N_k \times N_k$.

According to the formula (12), the channel matrix between the base station and each user terminal may be considered as the product of the unitary matrix $U_k$ and the diagonal matrix $D_k$, and in the user terminal, the receiver may be designed as $$G_k = D_k^{-1} U_k^H \quad (13).$$

At this time, a plurality of data streams in each user are decoupled to one another through the pre-filtering of $U_k^H$, and the maximum likelihood estimation of each data stream is reached through the next level $D_k^{-1}$, thereby simplifying the receiver, and reducing the computations required for inspection.

The embodiments of the method for transmitting signals by the transmitting end, the method for receiving signals by the receiving end, and the apparatus for transmitting the signals by the transmitting end in the multi-user MIMO communication system are given as follows.

FIRST EMBODIMENT

A Multi-User MIMO Communication System without Power Water-Filling

Figure 1:
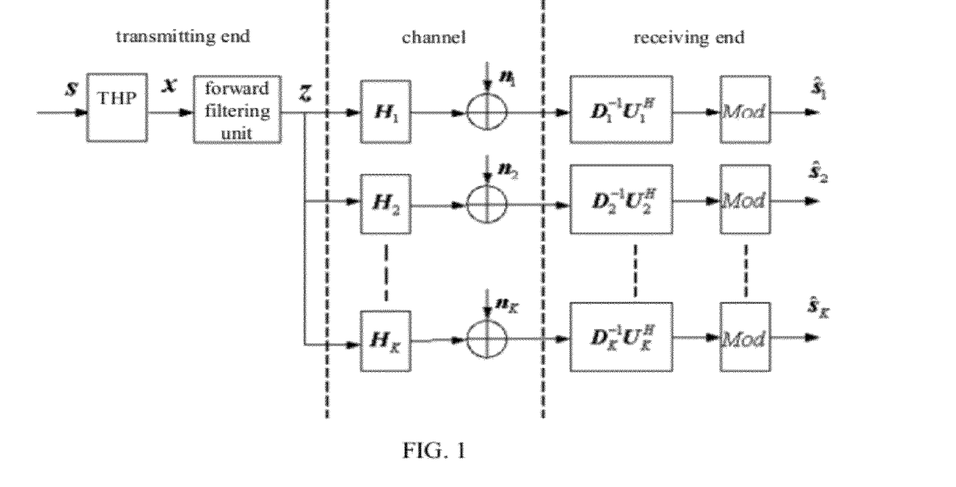
FIG. 1 is a transceiving principle diagram of a multi-user MIMO communication system according to a first embodiment of the present invention.

FIG. 1 is a transceiving principle diagram of a multi-user MIMO communication system according to a first embodiment of the present invention.

In the first embodiment, the signal transmission includes the following steps.

In Step 11, THP is performed on raw data $s_k$ of a $k^{th}$ user terminal, so as to obtain $x_k$, which is represented by the following formula:

$$x_k = \left\{ s_k - L_k^{-1} \left( \sum_{i=1}^{k-1} L_{ki} x_i \right) \right\} \bmod \tau = s_k - L_k^{-1} \left( \sum_{i=1}^{k-1} L_{ki} x_i \right) + \tau l_k, \quad (14)$$

$$k = 1, 2, \ldots, K.$$

A modulus $\tau$ is determined by a transmission power and a modulation order. For example, if a multi-level quadrature amplitude modulation (M-QAM) is adopted, $\tau = \sqrt{M}$. In the formula (14), $$\sum_{i=1}^{k-1} L_{ki} x_i$$

represents an interference on data of the $k^{th}$ coding sequence caused by transmitting data whose coding sequence ranges from $1^{st}$ to $(k-1)^{th}$ to the receiving end, and $$L_k^{-1} \left( \sum_{i=1}^{k-1} L_{ki} x_i \right)$$

represents an equivalent interference, on the transmitting end, converted from the interference on the data of the $k^{th}$ coding sequence caused by transmitting the data whose coding sequence ranges from $1^{st}$ to $(k-1)^{th}$ to the receiving end.

Figure 2:
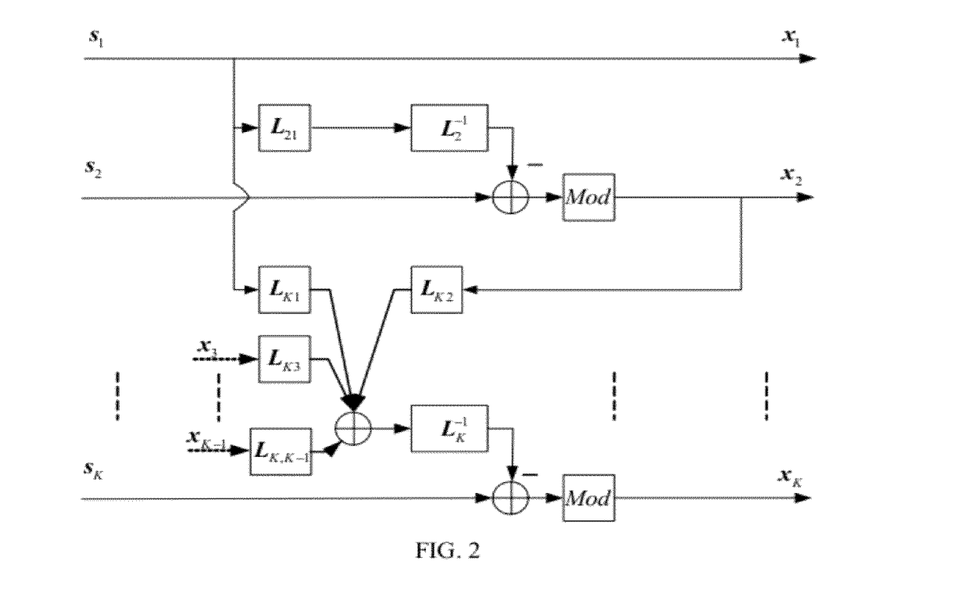
FIG. 2 is a schematic view of coding raw data according to the first embodiment of the present invention.

FIG. 2 shows a block diagram of performing the THP on the raw data to obtain the data $x_k$ in Step 11.

Through the THP in Step 11, the interference on the user coded later caused by the user coded earlier is pre-eliminated, so as to improve the communicate capacity and enhance the system performance.

In Step 12, the forward filtering is performed on the obtained x to obtain a signal z to be transmitted, which is represented by the following formula:

$$z = Qx \quad (15).$$

The transmitting end transmits the signal z obtained according to Steps 11 and 12 to the receiving end through the channel, so that the signal received on the receiving end is $$y = Hz \quad (16)$$

$$= HQx + n$$

$$= LQ^H Qx + n$$

-continued $$= \begin{pmatrix} L_1 & & & \\ L_{21} & L_2 & & \\ \cdots & \cdots & \ddots & \\ L_{K1} & L_{K2} & \cdots & L_K \end{pmatrix} x + n = \begin{pmatrix} L_1 s_1 \\ L_2(s_2 + \tau l_2) \\ \vdots \\ L_K(s_K + \tau l_K) \end{pmatrix} + n$$

in which, $$L = \begin{pmatrix} L_1 & & & \\ L_{21} & L_2 & & \\ \cdots & \cdots & \ddots & \\ L_{K1} & L_{K2} & \cdots & L_K \end{pmatrix}.$$

If $L_k = U_k D_k$ as shown in the formula (12), the $k^{th}$ user takes $G_k = D_k^{-1} U_k^H$ as the receiver, performs a modulo operation, and then obtains raw data trough making decision, which is represented by the following formula:

$$\hat{s}_k = (G_k y_k) \bmod \tau = (D_k^{-1} U_k^H y_k) \bmod \tau = (s_k + \tau l_k + \tilde{n}_k) \bmod \tau = s_k + \tilde{n}_k \quad (17).$$

According to the first embodiment, in the method and the apparatus for transmitting signals in the multi-user MIMO communication system, the THP is performed on data, an MIMO channel is decomposed to a product of a block triangular matrix and a unitary matrix, so as to effectively eliminate the interferences among multiple users, thereby improving a system data rate. Furthermore, the system communication capacity is further improved by utilizing the combined processing among the plurality of antennas at the receiving end. In the first embodiment, the sub-matrix on each main diagonal element in the block triangular matrix generated by decomposing the channel matrix is also the product of the unitary matrix and the diagonal matrix, thereby simplifying the processing at the receiving end.

Figure 3:
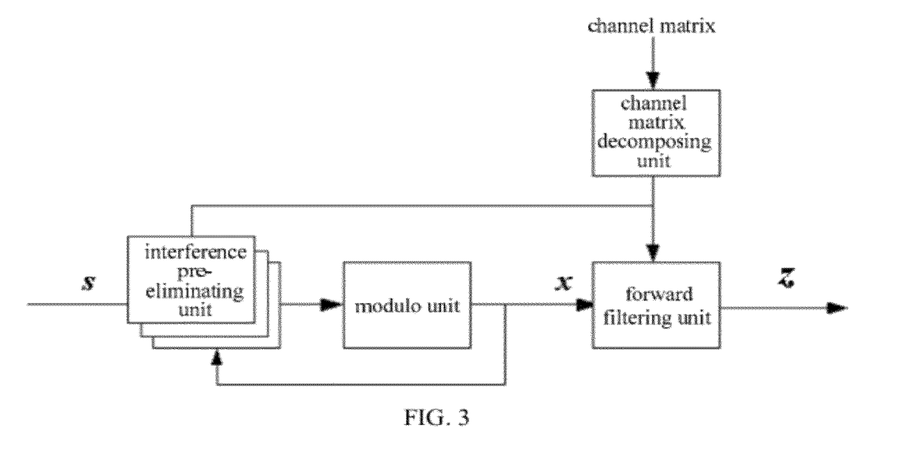
FIG. 3 is a schematic view of a signal transmission apparatus according to the first embodiment of the present invention.

The signal transmission apparatus in the first embodiment is described as follows. As shown in FIG. 3, the apparatus includes a channel matrix decomposing unit and a forward filtering unit.

The channel matrix decomposing unit decomposes a channel matrix to a product of a block lower triangular matrix L and a unitary matrix Q, and transmits the product to the forward filtering unit. The forward filtering unit obtains the unitary matrix Q generated by decomposing the channel matrix from the channel matrix decomposing unit, uses the obtained unitary matrix Q to perform a forward filtering on data to obtain a signal to be transmitted, and outputs the signal. Furthermore, the signal transmission apparatus further includes a multi-level interference pre-eliminating unit and a modulo unit. The interference pre-eliminating unit obtains the block lower triangular matrix generated by decomposing the channel matrix from the channel matrix decomposing unit, uses data obtained by a feedback from the modulo unit and the obtained block lower triangular matrix to pre-eliminate the interference on raw data, and transmits the data obtained by pre-eliminating the interference to the modulo unit. The modulo unit performs a modulo operation on the data obtained by pre-eliminating the interference by the interference pre-eliminating unit, transmits the data to the forward filtering unit, and feeds back the data to a lower-level interference pre-eliminating unit. The forward filtering unit is further adapted to perform the forward filtering on the data obtained by the modulo unit by using the unitary matrix Q to obtain the signal to be transmitted, and outputs the signal.

SECOND EMBODIMENT

A System Having the Power Water-Filling

Figure 4:
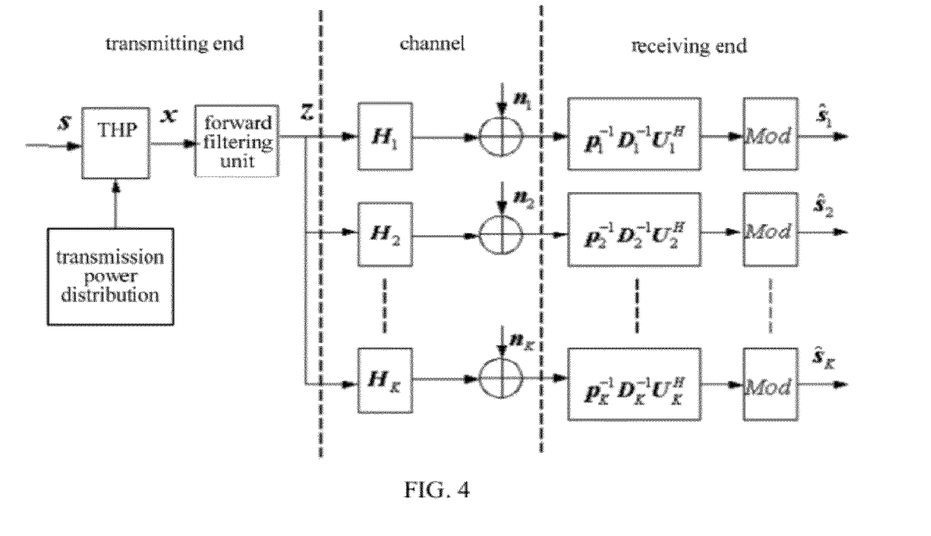
FIG. 4 is a transceiving principle diagram of a multi-user MIMO communication system according to a second embodiment of the present invention.

In the second embodiment, the power water-filling is performed on the transmitting end, so that the system data rate is maximized while the transmission power of the base station remains unchanged. FIG. 4 is a transceiving principle diagram of a multi-user MIMO communication system according to a second embodiment of the present invention.

It is assumed that the transmission power distributed to the $k^{th}$ user is $p_k = \mathrm{diag}([p_{k_1}\ p_{k_2}\ \cdots\ p_{k_N}])$, in which each element corresponds to a different data stream of the $k^{th}$ user, and accordingly, the signal transmission in the second embodiment includes the following steps.

In Step 21, THP is performed on raw data $s_k$ of a $k^{th}$ user terminal, and then the coding is adjusted according to the distributed transmission power $p_k$ to obtain a transmission power of the user data, so as to obtain data $x_k$, which is represented by the following formula:

$$x_k = p_k \left\{ \left[ s_k - p_k^{-1} L_k^{-1} \left( \sum_{i=1}^{k-1} L_{ki} x_i \right) \right] \bmod \tau \right\} \quad (18)$$

$$= p_k (s_k + \tau l_k) - L_k^{-1} \left( \sum_{i=1}^{k-1} L_{ki} x_i \right)$$

In the formula (18), $$\sum_{i=1}^{k-1} L_{ki} x_i$$

represents an interference on data of the $k^{th}$ coding sequence caused by transmitting data whose coding sequence ranges from $1^{st}$ to $(k-1)^{th}$ to the receiving end, and $$p_k^{-1} L_k^{-1} \left( \sum_{i=1}^{k-1} L_{ki} x_i \right)$$

represents an equivalent interference for the transmitting end converted from the interference on the data of the $k^{th}$ coding sequence caused by transmitting the data whose coding sequence ranges from $1^{st}$ to $(k-1)^{th}$ to the receiving end.

Figure 5:
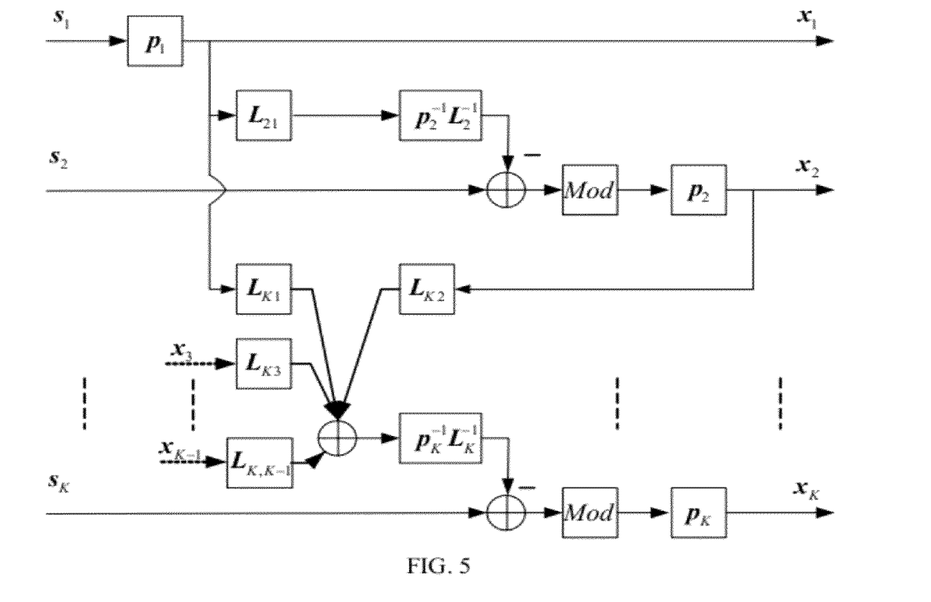
FIG. 5 is a schematic view of coding raw data and distributing a transmission power according to the second embodiment of the present invention.

FIG. 5 shows a block diagram of performing the THP on the raw data $s_k$ and distributing the transmission power to obtain the data $x_k$ in Step 21.

In Step 22, the forward filtering is performed on the obtained data x to obtain a signal z to be transmitted, which is represented by the formula (15).

In the second embodiment, the transmitting end transmits the signal z obtained according to Steps 21 and 22 to the receiving end through the channel, so that the signal received on the receiving end is $$y = Hz \quad (19)$$
$$= HQx + n$$
$$= LQ^H Qx + n$$

-continued $$= \begin{pmatrix} L_1 & & & \\ L_{21} & L_2 & & \\ \cdots & \cdots & \ddots & \\ L_{K1} & L_{K2} & \cdots & L_K \end{pmatrix} x + n = \begin{pmatrix} L_1 p_1 s_1 \\ L_2(s_2 + \tau l_2) \\ \vdots \\ L_K p_k(s_K + \tau l_K) \end{pmatrix} + n,$$

in which, $$L = \begin{pmatrix} L_1 & & & \\ L_{21} & L_2 & & \\ \cdots & \cdots & \ddots & \\ L_{K1} & L_{K2} & \cdots & L_K \end{pmatrix}.$$

If $L_k = U_k D_k$ as shown in the formula (12), the $k^{th}$ user takes $G_k = p_k^{-1} D_k^{-1} U_k^H$ as the receiver, performs a modulo operation, and then obtains the raw data trough making decision, which is represented by the following formula $$\hat{s}_k = (G_k y_k) \bmod \tau = (p_k^{-1} D_k^{-1} U_k^H y_k) \bmod \tau = (s_k + \tau l_k + \tilde{n}_k) \bmod \tau = s_k + \tilde{n}_k \quad (20).$$

The second embodiment not only achieves the technical effect of the first embodiment, but also achieves a function of conveniently switching between the space division multiplexing (the number of the data streams is equal to the number of the transmission antennas) and the wave beam formation (the number of the data streams is smaller than the number of the transmission antennas) through the power water-filling on the transmitting end, thereby reaching a desirable self-adaptability.

Figure 6:
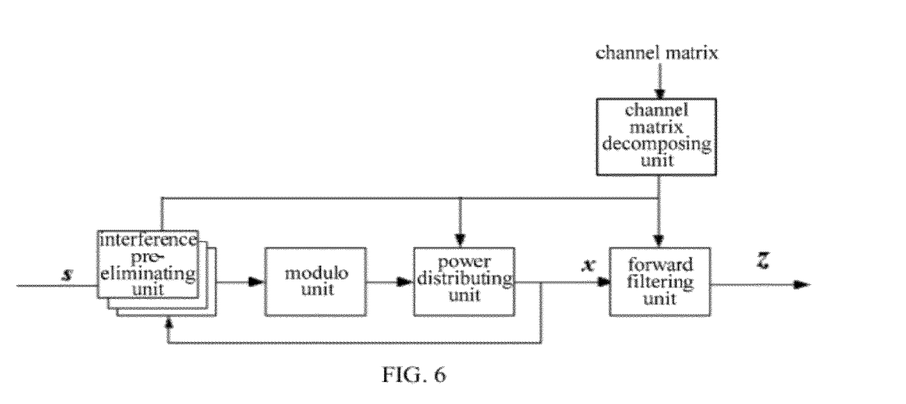
FIG. 6 is a schematic view of a signal transmission apparatus according to the second embodiment of the present invention.

The multi-user MIMO apparatus for transmitting signal in the second embodiment is described as follows. As shown in FIG. 6, in addition to the multi-level interference pre-eliminating unit, the modulo unit, the forward filtering unit, and the channel matrix decomposing unit in the first embodiment, the apparatus in the second embodiment further includes a power distributing unit. In the apparatus of the second embodiment, the modulo unit only needs to transmit the data obtained after the modulo operation to the power distributing unit, without feeding back the data to the interference pre-eliminating unit. The power distributing unit receives the data from the modulo unit, performs a power distribution on the data, transmits the data to the forward filtering unit, and feeds back the data to the interference pre-eliminating unit. Here, the interference pre-eliminating unit pre-eliminates the interference on the raw data by utilizing the data obtained by a feedback from the power distributing unit.

THIRD EMBODIMENT

Optimization of the Coding Sequences

In the multi-user MIMO system, different coding sequences may result in different performances. Therefore, it is a problem worth considering how to optimize the coding sequences. As for the equivalent channel obtained according to the above processing on the transmitting end, if the receiver for each user is considered, equivalent channel gains formed by a plurality of data streams of multiple users are determined by a diagonal element of $D_k$, k=1, ..., K. As for a specific coding sequence $\pi_1$, D=diag($D_1 D_2 \ldots D_K$) is defined, and the diagonal element thereof is d=($d_1 d_2 \ldots d_M$). In this case, the reachable data rate of the system obtained through a water-filling algorithm is $$R(\pi_l) = \sum_{i=1}^{M} \log_2 \left(1 + \frac{d_i^2 p_i}{\sigma_i^2}\right), \quad (21)$$

$$p_i = \left[\frac{1}{\lambda} - \frac{\sigma_i^2}{d_i^2}\right]^+, \quad (22)$$

$$\sum_{i=1}^{M} p_i = P, \quad (23)$$

in which $[x]^+ \square \max(x,0)$, P is the total transmission power, and $\sigma_i^2$ is a receiving noise variance corresponding to an ith stream. Therefore, for the K-user MIMO system, totally K! types of possible coding sequences $\pi_1, \pi_2, \ldots, \pi_{K!}$ exist. For each type of coding sequence, the data rate of the system after the water-filling is obtained through the formula (21), and thus the optimal coding sequence is:

$$O^{opt} = \underset{i=1,\ldots,K!}{\operatorname{argmax}} R(\pi_i). \quad (24)$$

If the coding sequences are determined by using the formula (22), this process performs a full search for different signal noise ratios, and the water-filling is performed for each type of sequence, so that a large number of computations are required. Therefore, a simplified algorithm is given as follows.

When the signal noise ratio SNR→∞, the following relation exists.

$$R = \sum_{i=1}^{M} \log_2 \left(1 + \frac{d_i^2 p_i}{\sigma_i^2}\right) \quad (25)$$

$$\approx \log_2 \left(\prod_{i=1}^{M} \frac{d_i^2 p_i}{\sigma_i^2}\right)$$

$$= \log_2 \left(\prod_{k=1}^{K} |D_k| \cdot \prod_{i=1}^{M} \frac{p_i}{\sigma_i^2}\right).$$

Therefore, if the $$\prod_{k=1}^{K} |D_k|$$

reaches a maximum level, the data rate R of the system reaches a maximum level.

As for the computation of $|D_k|$, k=K, K−1, ..., 1, it is not necessary to repeatedly decompose the block lower triangular matrix, but it may be performed according to the following process.

Firstly, it is assumed that $\overline{H}_k$ is $$\overline{H}_k = H_k \left(I - \sum_{i=1}^{k-1} V_i V_i^H\right) = H_k \left[I - \overline{H}_{k-1}^H \left(\overline{H}_{k-1} \overline{H}_{k-1}^H\right)^{-1} \overline{H}_{k-1}\right], \quad (26)$$

then,

-continued $$|\vec{H}_k \vec{H}_k^H| = |U_k D_k V_k^H V_k D_k U_k^H| = |D_k|^2, \quad (27)$$

in which, $$\vec{H}_k \square [H_1^H \ H_2^H \ ... \ H_{k-1}^H]^H.$$

Therefore, the coding sequence for enabling $$\prod_{k=1}^{K} |D_k|$$

to reach the maximum level can be determined by using the channel function $H_k$ from the base station to each user, and each user data is coded according to a coding sequence corresponding to the $$\prod_{k=1}^{K} |D_k|$$

at the maximum level. Through the above process, in addition to achieving the technical effects of the first embodiment and the second embodiment, the third embodiment can further determine a preferred coding sequence while requiring fewer computations, thereby maximizing the reachable data rate of the communication system.

In the third embodiment, the signal transmission includes the following steps.

In Step 31, a coding sequence for enabling $$\prod_{k=1}^{K} |D_k|$$

to reach the maximum level is determined.

In Step 32, according to the determined coding sequence, THP is performed on raw data of a user terminal. When the transmitting end performs the water-filling on the transmission power, this step further includes distributing a transmission power to each user data obtained by coding.

In Step 33, the forward filtering is performed on the data obtained in Step 32 to obtain a signal to be transmitted.

In the third embodiment, the particular process for realizing Steps 32 and 33 may adopt the process given in the first embodiment and the second embodiment, so the descriptions thereof are omitted here.

Figure 7:
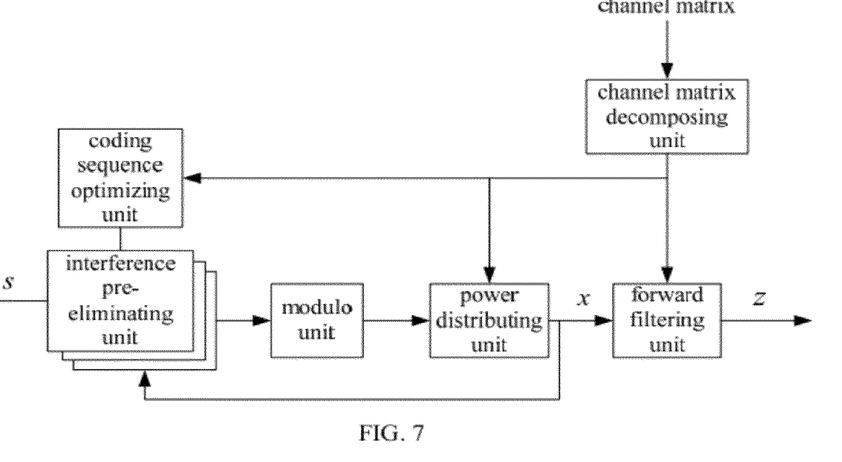
FIG. 7 is a schematic view of a signal transmission apparatus according to a third embodiment of the present invention.

The multi-user MIMO apparatus for transmitting signal of the third embodiment is described as follows. As shown in FIG. 7, in addition to the multi-level interference pre-eliminating unit, the modulo unit, the forward filtering unit, the channel matrix decomposing unit, and the power distributing unit in the second embodiment, the apparatus in the third embodiment further includes a coding sequence optimizing unit. In the apparatus of the third embodiment, the coding sequence optimizing unit obtains a block lower triangular matrix generated by decomposing a channel matrix from the channel matrix decomposing unit, decomposes a sub-matrix on a diagonal line in the block lower triangular matrix to a product of a unitary matrix and a diagonal matrix, uses the diagonal matrix generated by decomposing to optimize the coding sequence, and transmits the optimized coding sequence to the interference pre-eliminating unit. In this case, the interference pre-eliminating unit codes each user data according to the obtained coding sequence.

In the above-mentioned embodiments, the channel matrix is decomposed to the product of the block lower triangular matrix and the unitary matrix, but it is not limited here, and the channel matrix may be decomposed to a product of a block upper triangular matrix and a unitary matrix. For the latter circumstance, the particular realizing manner thereof can be obtained with reference to the above embodiments, so it is omitted here.

In order to effectively describe the technical effects of embodiments of the present invention, the inventor(s) emulates various possible multi-user MIMO systems. During the emulating process, it is assumed that a downlink channel from a base station to each user follows a dependent Rayleigh distribution, and remains unchanged in one data frame. In all the emulations, it is assumed that the base station can obtain the downlink channel information completely, that is to say, the method provided by embodiments of the present invention is applicable to a time division duplex (TDD) system or a frequency division duplex (FDD) system with channel information feedback. As for each different scenario, Monte Carlo emulations are carried out for more than 20,000 times.

Combined with the emulation results, the improvement of the system performance brought by the signal transmission method in the multi-user MIMO communication system of embodiments of the present invention is described.

(1) Four-Transmit and Two-Receive Two-User MIMO System

Figure 8:
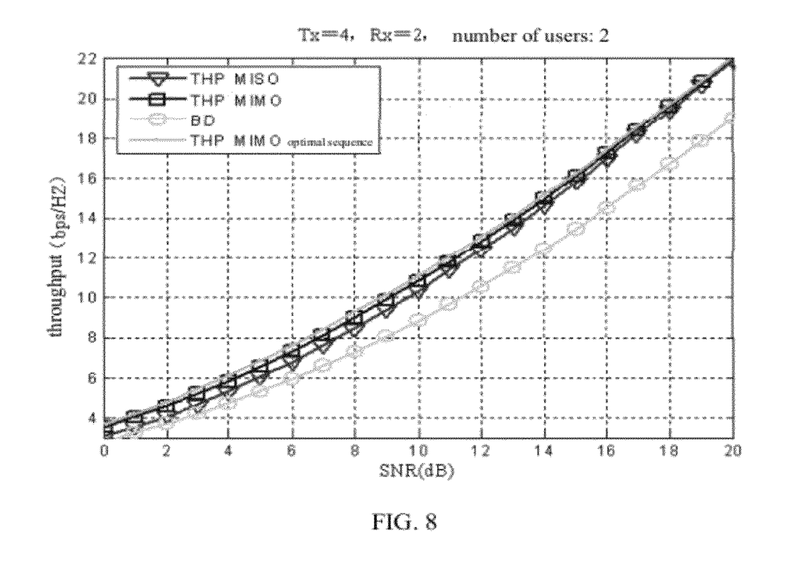
FIG. 8 shows a performance curve of a reachable data rate for a four-transmit and two-receive two-user MIMO system in an emulation result.

FIG. 8 shows a performance curve of a reachable data rate of the system. As seen from FIG. 8, when SNR=10 dB, the reachable data rate is increased for approximately 2 bits by adopting the MIMO-THP as compared with a block diagonal (BD) algorithm, and it is increased for approximately 0.6 bits as compared with the MISO-THP. After the optimal coding sequence is adopted, it is increased for approximately 0.15 bits. When SNR→∞, the three curves adopting the THP tend to coincide with one another.

Figure 9:
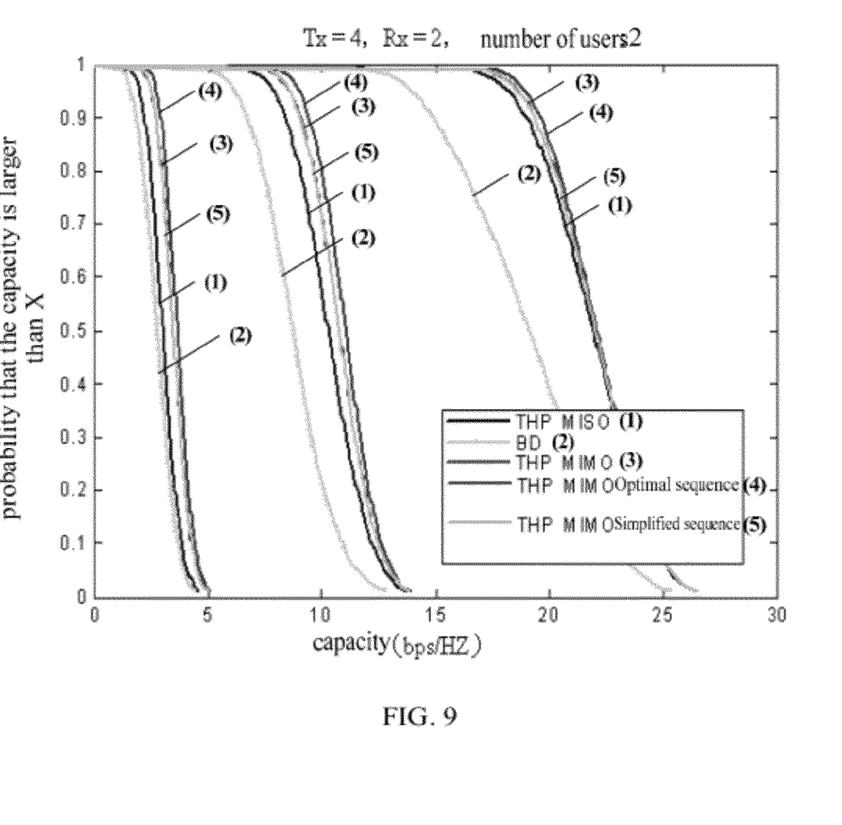
FIG. 9 shows a probability distribution curve of the reachable data rate for the four-transmit and two-receive two-user MIMO system in the emulation result.

FIG. 9 shows a cumulative distribution function (CDF) curve of a probability of the reachable data rate. As known from FIG. 9 that, when SNR=10 dB and the probability is greater than 50%, the reachable data rate is increased approximately for 0.6 bits by adopting the MIMO-THP as compared with the MISO-THP. Once a sub-optimal sequence is adopted, the CDF of the system data rate coincides with the one that is not sorted. Upon adopting the optimal sequence, a certain performance gain is obtained.

Figure 10:
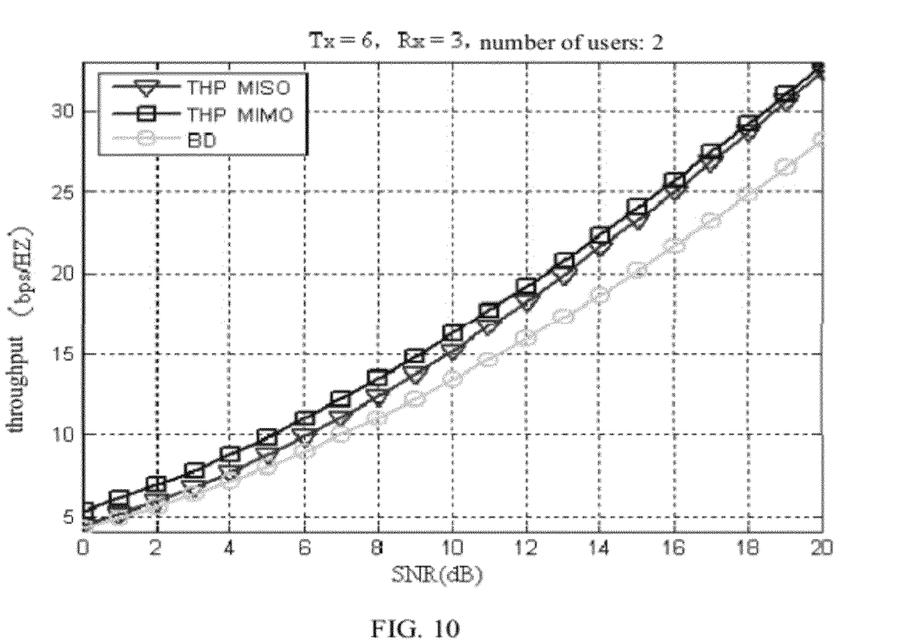
FIG. 10 shows a performance curve of a reachable data rate for a six-transmit and three-receive two-user MIMO system in an emulation result.
Figure 11:
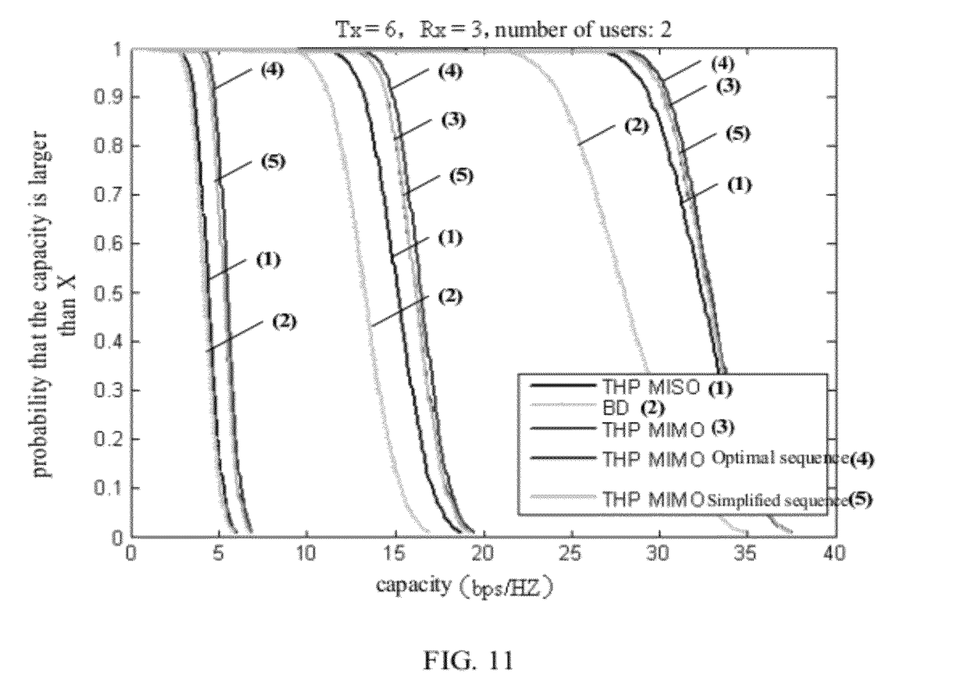
FIG. 11 shows a probability distribution curve of the data rate for the six-transmit and three-receive two-user MIMO system in the emulation result.
Figure 12:
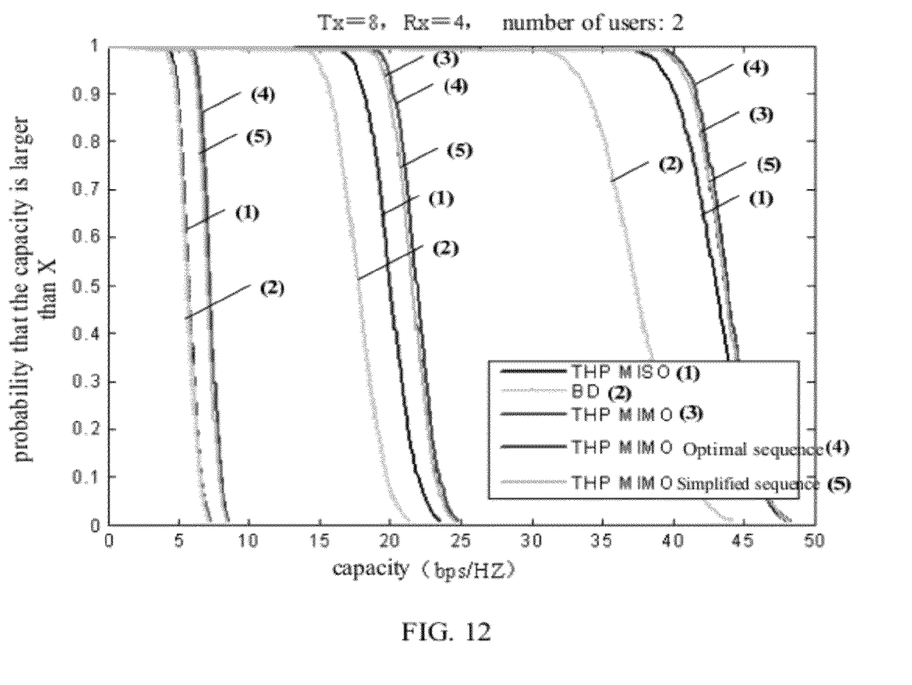
FIG. 12 shows a probability distribution curve of a data rate for an eight-transmit and four-receive two-user MIMO system in an emulation result.

(2) Six-Transmit and Three-Receive Two-User MIMO System and Eight-Transmit and Four-Receive Two-User MIMO System FIG. 10 and FIG. 11 respectively show the reachable data rate and the probability distribution curves of the reachable data rate of the six-transmit and three-receive two-user MIMO system. FIG. 12 shows probability distribution curves of the eight-transmit and four-receive two-user MIMO system. It may be known from FIGS. 10-12 that, as the receiving antennas at a user end are increased, the reachable data rate of the system is greatly improved by adopting the MIMO-THP as compared with the MISO-THP, that is, reaching 1.3 bits (3 antennas at the receiving end) and 2 bits (4 antennas at the receiving end) in a large scope, and the gains brought by adopting the optimal and sub optimal sequences are relatively small. The reason is that, the more the antennas at the receiving end are, the more distinct the grain brought by the combined receiving process is, and the effect generated by the sequence is not so distinct under a situation of fewer users.

(3) Four-Transmit and One-Receive Four-User MISO System

Figure 13:
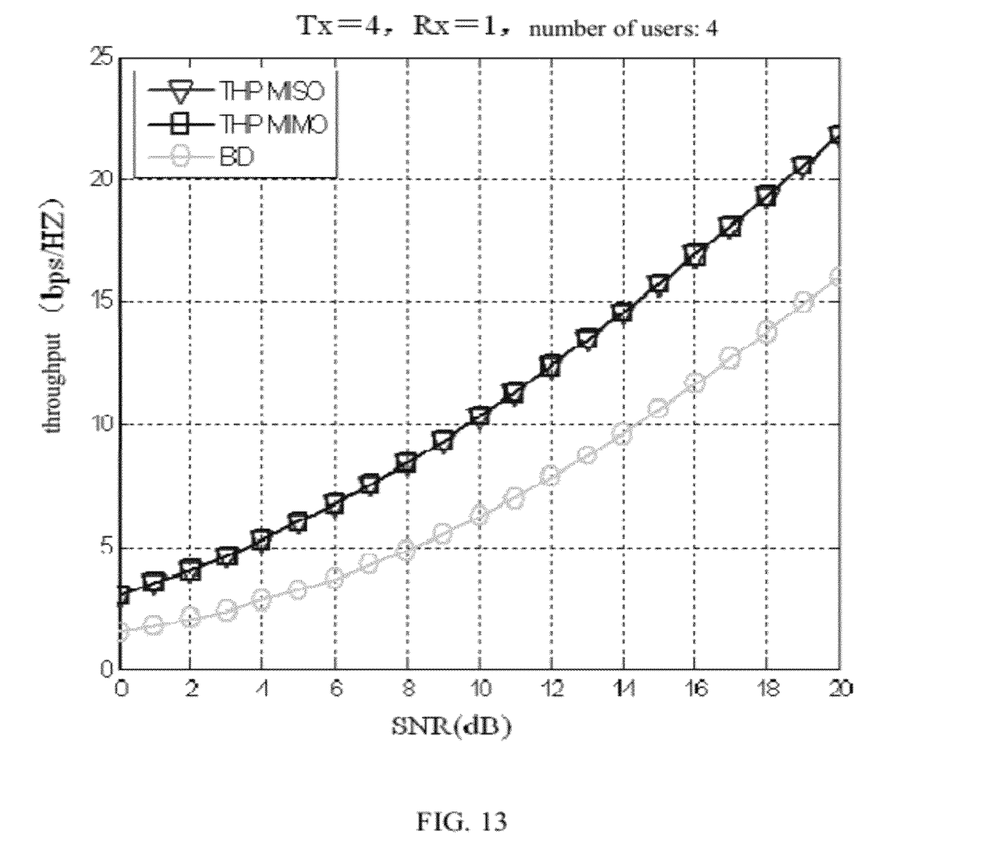
FIG. 13 shows a performance curve of a reachable data rate for a four-transmit and one-receive four-user MISO system in an emulation result.

FIG. 13 shows a performance curve of a reachable data rate of the system. It may be known from FIG. 13 that, the curve of the MIMO-THP and that of the MISO-THP totally coincide with each other. Therefore, it is indicated that the MIMO-THP may be considered as an extension for the conventional MISO-THP, which is applicable to a single-antenna multi-user system, and is also applicable to a multi-antenna multi-user system.

As known from the above emulation results that, the signal transmission method in the multi-user MIMO communication system provided by embodiments of the present invention can enhance the system data rate.

Furthermore, in embodiments of the present invention, by means of optimizing the coding sequence, the system data rate is improved. The process for optimizing the coding sequence of embodiments of the present invention can reduce the computations for optimizing the coding sequence, so as to reduce the computation burden of the transmitting end, thereby improving the system performance.

In addition, the signal transmission method in the multi-user MIMO communication system of embodiments of the present invention is applicable to the multi-user MISO communication system. When the multi-user MISO communication system also adopts the method provided by embodiments of the present invention, it achieves the same performance as the current THP process of the multi-user MISO system, in consideration of the system capacity.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A multi-user multi-input multi-output (MIMO) method for transmitting signals, comprising:
   performing a Tomlinson-Harashima pre-coding (THP) on raw data elements;
   decomposing a channel matrix to a product of a block triangular matrix and a first unitary matrix; and
   generating a signal to be transmitted by performing a forward filtering on the THP coded data elements by using the first unitary matrix.

2. The method according to claim 1, wherein the block triangular matrix comprises one of a block lower triangular matrix and a block upper triangular matrix.

3. The method according to claim 1, wherein the performing the THP comprises:
   determining coding sequences for the raw data elements wherein each of the raw data element corresponds to a coding sequence;
   eliminating an equivalent interference on a transmitting end from the raw data element of a $k^{th}$ coding sequence, wherein the equivalent interference is converted from an interference on the raw data element of the $k^{th}$ coding sequence caused by transmitting different raw data elements whose coding sequence ranges from $1^{st}$ to $(k-1)^{th}$ to a receiving end; and
   performing a modulo operation on the raw data element of the $k^{th}$ coding sequence with the equivalent interference being eliminated, wherein a modulus in the modulo operation is determined by a transmission power and a modulation order.

4. The method according to claim 3, wherein the interference on the raw data element of the $k^{th}$ coding sequence is $$\sum_{i=1}^{k-1} L_{ki} x_i,$$

and
   the equivalent interference is $$L_k^{-1} \left( \sum_{i=1}^{k-1} L_{ki} x_i \right),$$

and
   wherein $x_i$ is data obtained by performing the THP on the raw data element of an $i^{th}$ coding sequence, $L_k^{-1}$ is an inverse matrix of a $k^{th}$ sub-matrix on a diagonal line of the block triangular matrix and $L_{ki}$ is a sub-block on a $k^{th}$ row and an $i^{th}$ column in the block triangular matrix.

5. The method according to claim 1, further comprising: distributing a transmission power to a $k^{th}$ receiving end before performing the forward filtering.

6. The method according to claim 5, wherein the performing the THP comprises:
   determining coding sequences for the raw data elements, wherein each raw data element corresponds to a coding sequence;
   eliminating an equivalent interference on a transmitting end from the raw data element of a $k^{th}$ coding sequence, wherein the equivalent interference is converted from an interference on the raw data element of the $k^{th}$ coding sequence caused by transmitting different raw data elements whose coding sequence ranges from $1^{st}$ to $(k-1)^{th}$ to a receiving end; and
   performing a modulo operation on the raw data element of the $k^{th}$ coding sequence with the equivalent interference being eliminated, wherein a modulus in the modulo operation is determined by a transmission power and a modulation order.

7. The method according to claim 6, wherein the interference on the raw data element of the $k^{th}$ coding sequence is $$\sum_{i=1}^{k-1} L_{ki} x_i,$$

the equivalent interference is $$p_k^{-1} L_k^{-1} \left( \sum_{i=1}^{k-1} L_{ki} x_i \right), \text{ and}$$

wherein $x_i$ is data obtained by performing the THP on the raw data element of an $i^{th}$ coding sequence, $L_k^{-1}$ is an inverse matrix of a $k^{th}$ sub-matrix on a diagonal line of the block triangular matrix, $L_{ki}$ is a sub-block on a $k^{th}$ row and an $i^{th}$ column in the block triangular matrix and $p_k^{-1}$ is a reciprocal of the transmission power distributed to the $k^{th}$ receiving end.

8. The method according to claim 3, wherein the determining the coding sequences for the raw data elements comprises:
  decomposing a sub-matrix on a diagonal line of the block triangular matrix to a product of a second unitary matrix and a diagonal matrix $D_k$; and
  determining coding sequences for enabling $$\prod_{k=1}^{K} |D_k|$$

to reach a maximum as the coding sequences for the raw data elements, wherein K is the number of receiving ends in a multi-user MIMO communication system.

9. The method according to claim 6, wherein the determining the coding sequences for the raw data elements comprises:
  decomposing a sub-matrix on a diagonal line of the block triangular matrix to a product of a second unitary matrix and a diagonal matrix $D_k$; and
  determining coding sequences for enabling $$\prod_{k=1}^{K} |D_k|$$

to reach a maximum as the coding sequences for the raw data elements, wherein K is the number of receiving ends in a multi-user MIMO communication system.

10. A multi-user multi-input multi-output (MIMO) apparatus for transmitting signals, comprising:
  a channel matrix decomposing unit configured to decompose a channel matrix to a product of a block triangular matrix and a first unitary matrix, and to transmit the block triangular matrix and the first unitary matrix; and
  a forward filtering unit configured to receive the first unitary matrix, perform a forward filtering on coded data elements to obtain a signal to be transmitted by using the first unitary matrix, and output the signal.

11. The apparatus according to claim 10, wherein the block triangular matrix comprises one of a block lower triangular matrix and a block upper triangular matrix.

12. The apparatus according to claim 10, further comprising:
  a multi-level interference pre-eliminating unit configured to obtain the block triangular matrix, pre-eliminate an interference on raw data elements by using data obtained by a feedback and the block triangular matrix, and transmit the raw data elements with the interference being pre-eliminated; and
  a modulo unit configured to receive the raw data elements with the interference being pre-eliminated, perform a modulo operation on the raw data elements with the interference being pre-eliminated, transmit the raw data elements with the modulo operation being performed as the coded data elements to the forward filtering unit for the forward filtering and to a lower-level interference pre-eliminating unit of the multi-level interference pre-eliminating unit.

13. The apparatus according to claim 10, further comprising:
  a multi-level interference pre-eliminating unit configured to obtain the block triangular matrix, pre-eliminate an interference on raw data elements by using data obtained by a feedback and the block triangular matrix, and transmit the raw data elements with the interference being pre-eliminated;
  a modulo unit configured to receive the raw data elements with the interference being pre-eliminated, perform a modulo operation on the raw data elements with the interference being pre-eliminated, transmit the raw data elements with the modulo operation being performed; and
  a power distributing unit configured to receive the raw data elements with the modulo operation being performed from the modulo unit, to perform a power distribution on the raw data elements with the modulo operation being performed, to transmit the raw data elements with the power distribution performed as the coded data elements to the forward filtering unit for the forward filtering, and to feedback the raw data elements with the power distribution performed to the multi-level interference pre-eliminating unit.

14. The apparatus according to claim 12, wherein the block triangular matrix is a block lower triangular matrix, the apparatus further comprising:
  a coding sequence optimizing unit configured to obtain the block lower triangular matrix, decompose a sub-matrix on a diagonal line of the block lower triangular matrix to a product of a second unitary matrix and a diagonal matrix, perform a data rate optimization on coding sequences for the raw data elements by using the diagonal matrix, and transmit the optimized coding sequences to the multi-level interference pre-eliminating unit.

15. The apparatus according to claim 13, wherein the block triangular matrix is a block lower triangular matrix, the apparatus further comprising:
  a coding sequence optimizing unit configured to obtain the block lower triangular matrix, decompose a sub-matrix on a diagonal line of the block lower triangular matrix to a product of a second unitary matrix and a diagonal matrix, perform a data rate optimization on coding sequences for the raw data elements by using the diagonal matrix, and transmit the optimized coding sequences to the multi-level interference pre-eliminating unit.

16. A multi-user multi-input multi-output (MIMO) communication system, comprising:
  a transmitting end configured to perform a Tomlinson-Harashima pre-coding (THP) on raw data elements, to decompose a channel matrix associated with a channel to a product of a block triangular matrix and a first unitary matrix, to perform a forward filtering on the THP coded data elements by using the first unitary matrix to obtain a signal to be transmitted, and transmit the signal through the channel;
  a plurality of receiving ends, configured to receive the signal, the plurality of receiving ends having a $k^{th}$ receiving end configured to pre-filter the received signal by utilizing a second unitary matrix $U_k^H$, to perform an estimation on the filtered signal by utilizing a diagonal matrix $D_k^{-1}$, to perform a modulo operation on the signal with estimation performed and to recover the raw data elements through making a decision on the signal with the modulo operation performed,
  wherein $U_k$ and $D_k$ satisfy $L_k = U_k D_k$, $L_k$ is a $k^{th}$ sub-matrix on a diagonal line of the block triangular matrix and k is an index number indicative of the $k^{th}$ receiving end of the plurality of the receiving ends.

17. The system according to claim 16, wherein the block triangular matrix comprises one of a block lower triangular matrix and a block upper triangular matrix.

18. The system according to claim 16, wherein
the transmitting end is further configured to distribute a transmission power before performing the forward filtering; and
the $k^{th}$ receiving end is further configured to normalize a power of the received signal by using the transmission power distributed by the transmitting end after pre-filtering the received signal through the second unitary matrix $U_k^H$.

* * * * *